United States Patent
Takiguchi

(10) Patent No.: US 9,798,165 B2
(45) Date of Patent: Oct. 24, 2017

(54) LIGHT MODULATION DEVICE

(71) Applicant: HAMAMATSU PHOTONICS K.K., Hamamatsu-shi, Shizuoka (JP)

(72) Inventor: Yuu Takiguchi, Hamamatsu (JP)

(73) Assignee: HAMAMATSU PHOTONICS K.K., Hamamatsu-shi, Shizuoka (JP)

(*) Notice: Subject to any disclaimer, the term of this patent is extended or adjusted under 35 U.S.C. 154(b) by 68 days.

(21) Appl. No.: 14/442,272

(22) PCT Filed: Oct. 22, 2013

(86) PCT No.: PCT/JP2013/078561
§ 371 (c)(1),
(2) Date: May 12, 2015

(87) PCT Pub. No.: WO2014/077092
PCT Pub. Date: May 22, 2014

(65) Prior Publication Data
US 2016/0274384 A1    Sep. 22, 2016

(30) Foreign Application Priority Data

Nov. 13, 2012  (JP) .................. 2012-249371

(51) Int. Cl.
*G02F 1/01*  (2006.01)
*G02F 1/1347*  (2006.01)
(Continued)

(52) U.S. Cl.
CPC .......... *G02F 1/0136* (2013.01); *G02B 5/189* (2013.01); *G02B 13/22* (2013.01); *G02B 26/02* (2013.01);
(Continued)

(58) Field of Classification Search
CPC ..... G02F 1/00; G02F 1/01; G02F 1/29; G02F 1/35; G02F 1/13; G02F 1/133;
(Continued)

(56) References Cited

U.S. PATENT DOCUMENTS

| 3,476,463 A | 11/1969 | J L Kreuzer |
| 2009/0128872 A1* | 5/2009 | Christmas .............. G02B 27/54 359/9 |
| 2010/0059490 A1* | 3/2010 | Unrath ............... B23K 26/0613 219/121.73 |

FOREIGN PATENT DOCUMENTS

| JP | 2001-272636 A | 10/2001 |
| JP | 2005-135479 A | 5/2005 |

(Continued)

OTHER PUBLICATIONS

M. Beversluis et al., "Programmable vector point-spread function engineering", Optics Express, vol. 14, No. 7, 2006, p. 2650-p. 2656.
(Continued)

*Primary Examiner* — Ricky Mack
*Assistant Examiner* — Robert E Tallman
(74) *Attorney, Agent, or Firm* — Drinker Biddle & Reath LLP

(57) ABSTRACT

A light modulation apparatus 1A includes a first spatial light modulator, a pinhole member, and a second spatial light modulator. The first spatial light modulator has a phase modulation plane on which a kinoform for performing intensity modulation is displayed, and generates modulated light P2. The pinhole member has a light passing hole for letting a first-order light component of the modulated light P2 pass therethrough, and blocks a zeroth-order light component of the modulated light P2. The second spatial light modulator has a polarization modulation plane that controls the polarization state of the modulated light P2 incident on
(Continued)

the polarization modulation plane through the light passing hole of the pinhole member, and generates modulated light P3.

8 Claims, 16 Drawing Sheets

(51) Int. Cl.
    *G02B 5/18*     (2006.01)
    *G02B 13/22*     (2006.01)
    *G02B 26/02*     (2006.01)
    *G02F 1/137*     (2006.01)

(52) U.S. Cl.
    CPC ........ *G02F 1/1347* (2013.01); *G02F 1/13731* (2013.01)

(58) Field of Classification Search
    CPC ............ G02F 1/133526; G02B 5/1876; G02B 21/0032; G02B 21/0056; G02B 21/14; B23K 26/0624; B23K 26/082; B23K 26/0652; B23K 26/067
    USPC ...... 359/10, 11, 35, 237, 245, 279, 457, 565
    See application file for complete search history.

(56) References Cited

FOREIGN PATENT DOCUMENTS

| JP | 2005-515878 A | 6/2005 |
|----|---------------|--------|
| JP | 2010-020098 A | 1/2010 |
| JP | 2010-151948 A | 7/2010 |
| WO | WO-03/036368 A1 | 5/2003 |

OTHER PUBLICATIONS

J. Kirk et. al., "Phase-Only Complex-Valued Spatial Filter", Journal of the Optical Society of America, vol. 61, No. 8, 1971, p. 1023-p. 1028.

H. Ren et. al., "Liquid-crystal-based linear polarization rotator", Applied physics Letters, vol. 90, Issue 12, Article 121123, 2007, p. 121123-1-p. 121123-3.

\* cited by examiner (a)

(b)

(a)

(b)

(a)

(b)

LIGHT MODULATION DEVICE

TECHNICAL FIELD

The present invention relates to a light modulation apparatus.

BACKGROUND ART

Non-Patent Document 1 discloses an optical device including two spatial light modulators. In this optical device, one spatial light modulator is of a phase modulation type, and the other spatial light modulator is of a polarization modulation type. These spatial light modulators are optically coupled to each other by a telecentric optical system.

CITATION LIST

Patent Literature

Patent Document 1: Japanese Patent Application Laid-Open No. 2005-135479

Non Patent Literature

Non-Patent Document 1: Michael R. Beversluis, Lukas Novotny, and Stephan J. Stranick, "Programmable vector point-spread function engineering," Optics Express, Vol. 14, No. 7, 3 Apr. 2006, pp. 2650-2656

SUMMARY OF INVENTION

Technical Problem

Recently, it has been studied to generate illumination light for an object in microscopy or laser light for use in laser processing by modulated light using a spatial light modulator. According to such a method, by controlling the display content of the spatial light modulator, an intensity distribution and polarization state, etc., of light with which an observation object or a processing object is irradiated can be freely controlled. However, conventionally, a device that performs intensity modulation by a spatial light modulator and a device that performs polarization modulation by a spatial light modulator have existed independently of each other, and there is a problem that using these in combination results in a large-sized device.

It is an object of the present invention to provide a light modulation apparatus that is capable of controlling the intensity distribution and polarization state and that allows downsizing.

Solution to Problem

A first light modulation apparatus according to one embodiment includes a first spatial light modulator including a first phase modulation plane including a plurality of regions arrayed one-dimensionally or two-dimensionally, and for displaying a kinoform for performing intensity modulation on the first phase modulation plane, and modulating light incident on the first phase modulation plane in phase in each of the plurality of regions to generate first modulated light, a member including a light passing hole for letting an nth-order light component (n is an integer other than 0) of the first modulated light pass therethrough, and for blocking a zeroth-order light component of the first modulated light, and a second spatial light modulator including a polarization modulation plane including a plurality of regions arrayed one-dimensionally or two-dimensionally, and for modulating the first modulated light incident on the polarization modulation plane through the light passing hole of the member in polarization state in each of the plurality of regions to generate second modulated light.

In addition, a second light modulation apparatus according to another embodiment includes a first spatial light modulator including a first phase modulation plane including a plurality of regions arrayed one-dimensionally or two-dimensionally, and for displaying a kinoform for performing intensity modulation on the first phase modulation plane, and modulating light incident on the first phase modulation plane in phase in each of the plurality of regions to generate first modulated light, a member including a light passing hole for letting an nth-order light component (n is an integer other than 0) of the first modulated light pass therethrough, and for blocking a zeroth-order light component of the first modulated light, a second spatial light modulator including a second phase modulation plane including a plurality of regions arrayed one-dimensionally or two-dimensionally, and for modulating the first modulated light incident on the second phase modulation plane through the light passing hole of the member in phase in each of the plurality of regions, and a phase plate disposed on an optical path of the first modulated light between the member and the second phase modulation plane and on an optical path of the second modulated light output from the second phase modulation plane, or a first phase plate disposed on an optical path of the first modulated light between the member and the second phase modulation plane and a second phase plate disposed on an optical path of the second modulated light output from the second phase modulation plane.

Further, in the first and second light modulation apparatuses, on the first phase modulation plane, a phase distribution for performing phase modulation of the first modulated light in each of the plurality of regions may be superimposed with the kinoform and displayed.

Further, the first and second light modulation apparatuses may further include a Kepler type both-sided telecentric optical system optically coupling the first spatial light modulator and the second spatial light modulator, and the member may be disposed on an optical path of the first modulated light between a pair of lenses constituting the both-sided telecentric optical system.

Further, the first and second light modulation apparatuses may further include a light source for outputting light having linear polarization toward the first phase modulation plane of the first spatial light modulator.

Advantageous Effects of Invention

The present invention can provide a light modulation apparatus that is capable of controlling the intensity distribution and polarization state and that allows downsizing.

DESCRIPTION OF EMBODIMENTS

Hereinafter, embodiments of a light modulation apparatus according to the present invention will be described in detail with reference to the accompanying drawings. In addition, in the description of the drawings, the same elements are denoted by the same reference symbols, and overlapping description will be omitted.

First Embodiment

Figure 1:
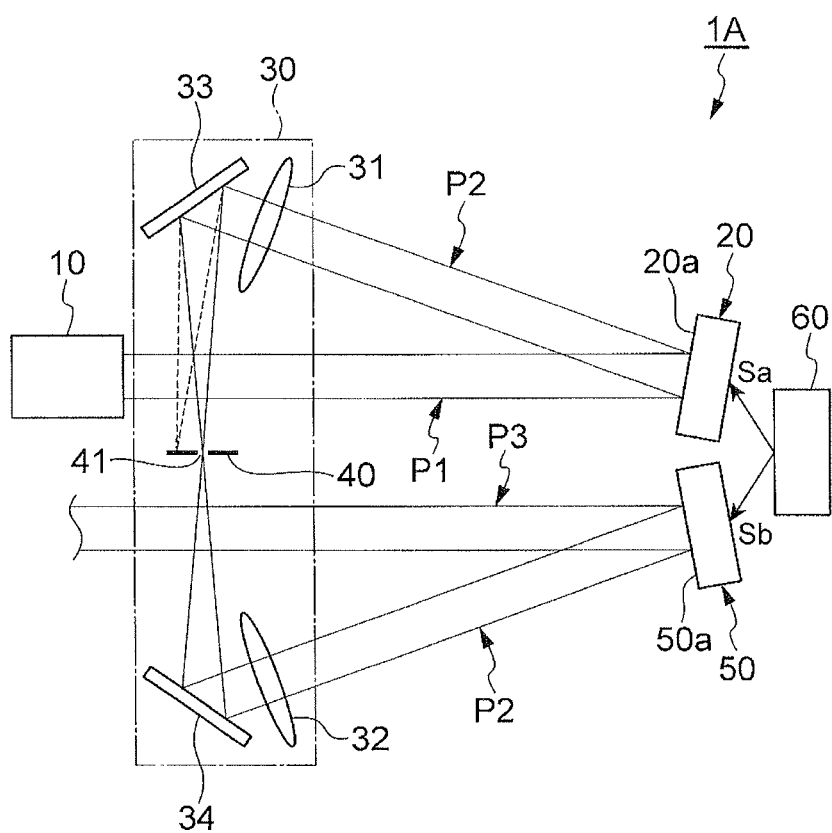
FIG. 1 is a view schematically showing a configuration of a light modulation apparatus according to a first embodiment of the present invention.

FIG. 1 is a view schematically showing a configuration of a light modulation apparatus 1A according to a first embodiment of the present invention. As shown in FIG. 1, the light modulation apparatus 1A of the present embodiment includes a light source 10, a first spatial light modulator (Spatial Light Modulator; SLM) 20, an optical system 30, a pinhole member 40, a second spatial light modulator (SLM) 50, and a control section 60.

The light source 10 outputs light P1 toward a phase modulation plane 20a of the spatial light modulator 20. The light P1 preferably has linear polarization, and is, for example, laser light. Further, the light P1 is made parallel (collimated). The light source 10 includes an optical system for collimating the light P1. In addition, the wavelength of the light P1 is not particularly limited, but is desirably a wavelength that allows securing a modulation phase width in the spatial light modulator 20 to be described later of $\pi$(rad) or more.

The first spatial light modulator 20 is a phase modulation type spatial light modulator. The spatial light modulator 20 has a first phase modulation plane 20a including a plurality of regions (pixels) that are arrayed one-dimensionally or two-dimensionally. The spatial light modulator 20 generates first modulated light P2 by modulating the phase of the light P1 in each of the plurality of regions. On the phase modulation plane 20a, a kinoform is displayed according to a control signal Sa provided from the control section 60. This kinoform is a kinoform for performing intensity modulation of the modulated light P2, and includes diffraction grating phase values respectively for the plurality of regions so that the modulated light P2 has a predetermined intensity distribution. Further, on the phase modulation plane 20a, a phase distribution for performing phase modulation of the modulated light P2 in each of the plurality of regions may be superimposed and displayed with the above-described kinoform. This phase distribution includes desired phase values individually set respectively for the plurality of regions. Further, on the phase modulation plane 20a, a wavefront phase distortion correction pattern for correcting wavefront phase distortion generated in both or either one of the spatial light modulator 20 and the second spatial light modulator 50 to be described later may be superimposed and displayed with the above-described kinoform. In an example, the phase value that is displayed in each region of the phase modulation plane 20a is a value in which a diffraction grating phase value, a desired phase value, and a wavefront phase distortion correction value are added. In addition, the wavefront phase distortion correction pattern may be a pattern for correcting phase distortion generated in the optical system as a whole or a part of the optical system. Further, it may be a pattern for correcting a phase change generated in the spatial light modulator 50. Further, in the spatial light modulator 20, a desired phase distribution (phase pattern) may be superimposed on the above-described kinoform.

Figure 2:
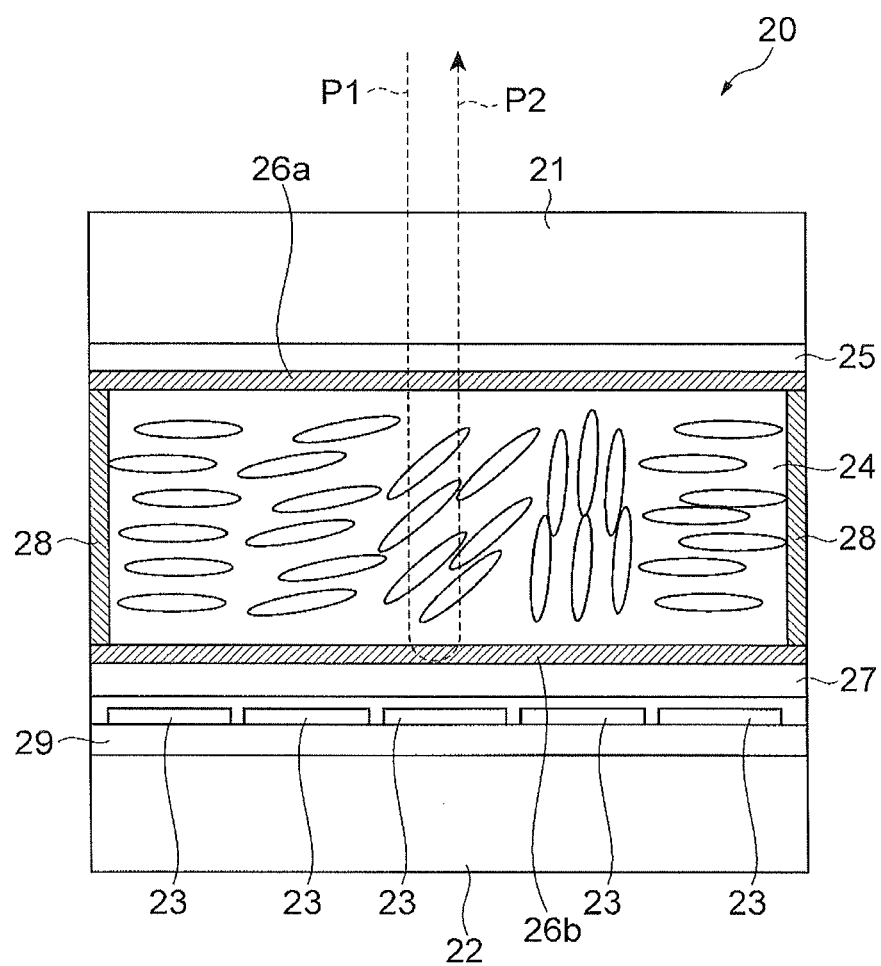
FIG. 2 is a sectional view schematically showing an LCOS type spatial light modulator as an example of a spatial light modulator of the first embodiment.

FIG. 2 is a sectional view schematically showing an LCOS type spatial light modulator as an example of the spatial light modulator 20 of the present embodiment, and shows a section taken along an optical axis of the light P1. The spatial light modulator 20 includes a transparent substrate 21, a silicon substrate 22, a plurality of pixel electrodes 23, a liquid crystal layer 24, a transparent electrode 25, alignment films 26a and 26b, a dielectric mirror 27, and a spacer 28. The transparent substrate 21 is made of a material that transmits light P1, and disposed along a principal surface of the silicon substrate 22. The plurality of pixel electrodes 23 are arrayed in a one-dimensional or two-dimensional grid pattern on the principal surface of the silicon substrate 22, and constitute respective pixels of the spatial light modulator 20. The transparent electrode 25 is disposed on a surface of the transparent substrate 21 that is opposed to the plurality of pixel electrodes 23. The liquid crystal layer 24 is disposed between the plurality of pixel electrodes 23 and the transparent electrode 25. The alignment film 26a is disposed between the liquid crystal layer 24 and the transparent electrode 25, and the alignment film 26b is disposed between the liquid crystal layer 24 and the plurality of pixel electrodes 23. The dielectric mirror 27 is disposed between the alignment film 26b and the plurality of pixel electrodes 23. The dielectric mirror 27 reflects the light P1 incident from the transparent substrate 21 and transmitted through the liquid crystal layer 24 so as to output again from the transparent substrate 21.

Further, the spatial light modulator 20 further includes a pixel electrode circuit (active matrix driving circuit) 29 that controls voltages to be applied between the plurality of pixel electrodes 23 and the transparent electrode 25. When voltage is applied to any pixel electrode 23 from the pixel electrode circuit 29, the refractive index of the liquid crystal layer 24 on the pixel electrode 23 changes according to the level of an electric field generated between the pixel electrode 23 and the transparent electrode 25. Thus, the optical path length of the light P1 that is transmitted through the relevant portion of the liquid crystal layer 24 changes, and accordingly, the phase of the light P1 changes. Moreover, by applying various levels of voltage to the plurality of pixel electrodes 23, a spatial distribution of the phase modulation amount can be electrically written, and various phase patterns such as kinoforms can be displayed according to necessity.

In addition, the spatial light modulator 20 is not limited to an electrically addressable liquid crystal element as shown in FIG. 2, and may be, for example, an optically addressable liquid crystal element or a deformable mirror type light modulator. Further, a reflection type spatial light modulator 20 is shown in FIG. 2, but the spatial light modulator 20 of the present embodiment may be a transmission type. Further, between the spatial light modulator 20 and the light source 10, an optical system including an optical component such as a beam expander and/or a spatial filter may be provided.

The optical system 30 includes a Kepler type both-sided telecentric optical system that optically couples the spatial light modulator 20 and the spatial light modulator 50. That is, the optical system 30 has a pair of a front lens 31 and a rear lens 32, and the front lens 31 and the rear lens 32 constitute a Kepler type a focal optical system ($4f$ optical system). Specifically, the optical distance between the front lens 31 and the rear lens 32 is substantially equal to a sum $(f_1+f_2)$ of a focal length $f_1$ of the front lens 31 and a focal length $f_2$ of the rear lens 32. Further, because the optical system 30 described above is an optical system that is telecentric on both sides, a focal plane of the rear lens 32 is in a conjugate relationship with the phase modulation plane 20a of the spatial light modulator 20. In addition, in the present embodiment, a polarization modulation plane 50a of the spatial light modulator 50 is disposed on the focal plane of the rear lens 32.

The optical system 30 may be configured such that the focal length of one or both of the front lens 31 and the rear lens 32 is changeable. For example, preparing a plurality of front lenses 31 (or rear lenses 32) that are different in focal length from each other and using these lenses selectively allows favorably realizing such configuration. Moreover, the optical system 30 having such configuration can arbitrarily change the lateral magnification of the modulated light P2. Further, because the imaging position of the modulated light P2 also changes in such configuration, it is preferable that the optical distance between the phase modulation plane 20a and the polarization modulation plane 50a is changed with a change in focal length.

Further, the optical system 30 of the present embodiment further has reflecting mirrors 33 and 34. The reflecting mirrors 33 and 34 are optical components for downsizing the light modulation apparatus 1A, and are disposed in line in a direction that intersects an optical axis direction of the light P1. The reflecting mirror 33 reflects the modulated light P2 output from the phase modulation plane 20a of the spatial light modulator 20 and passed through the front lens 31, toward the reflecting mirror 34. Further, the reflecting mirror 34 reflects the modulated light P2 having reached from the reflecting mirror 33, toward the polarization modulation plane 50a of the spatial light modulator 50 disposed near the spatial light modulator 20. This modulated light P2 passes through the rear lens 32 on an optical path between the reflecting mirror 34 and the polarization modulation plane 50a.

The modulated light P2 output from the phase modulation plane 20a includes a zeroth-order light component and an nth-order light component (n is an integer other than 0) generated according to a diffraction pattern of a kinoform displayed on the phase modulation plane 20a. In the present embodiment, the modulated light P2 output from the phase modulation plane 20a is once focused between the front lens 31 and the rear lens 32. The pinhole member 40 is disposed on an optical path of the modulated light P2 between the front lens 31 and the rear lens 32, and favorably, is provided such that its position in the optical axis direction overlaps with a focusing position of the nth-order light component of the modulated light P2. For example, the pinhole member 40 has a light passing hole 41 which is an optical opening for letting a first-order light component of the modulated light P2 pass therethrough, and blocks the zeroth-order light component that cannot pass through the light passing hole 41.

The light passing hole 41 desirably has an inner diameter that allows sufficiently blocking the zeroth-order light component and sufficiently transmitting the nth-order light component. The pinhole member 40 may further have a mechanism for adjusting the inner diameter of the light passing hole 41. Further, the pinhole member 40 may further have a mechanism for adjusting the position of the light passing hole 41 within a plane that intersects an optical axis of the nth-order light component such that the optical axis of the nth-order light component of the modulated light P2 and the light passing hole 41 can be easily positionally aligned. Further, a Fourier mask may be formed on the light passing hole 41.

The second spatial light modulator 50 is a polarization modulation type spatial light modulator. The spatial light modulator 50 has a second polarization modulation plane 50a including a plurality of regions that are arrayed one-dimensionally or two-dimensionally. The spatial light modulator 50 generates second modulated light P3 by modulating the polarization state of the modulated light P2 incident on the polarization modulation plane 50a through the light passing hole 41 of the pinhole member 40 in each of the plurality of regions. On the polarization modulation plane 50a, a polarization distribution pattern is displayed according to a control signal Sb provided from the control section 60. The spatial light modulator 50 is favorably realized, for example, in the configuration of the spatial light modulator 20 shown in FIG. 2, by the liquid crystal layer 24 being replaced with a twisted nematic liquid crystal layer. The modulated light P3 subjected to polarization modulation by the polarization modulation plane 50a exits to the outside of the light modulation apparatus 1A with an optical axis that is along the optical axis direction of the light P1.

The control section 60 causes the phase modulation plane 20a to display a phase pattern including a kinoform by providing a control signal Sa to the spatial light modulator 20 such that the modulated light P2 has a predetermined intensity distribution, and more preferably, such that the modulated light has a predetermined intensity distribution and phase distribution. Further, the control section 60 causes the polarization modulation plane 50a to display a polarization pattern by providing a control signal Sb to the spatial light modulator 50 such that the modulated light P3 has a predetermined polarization state.

Figure 3:
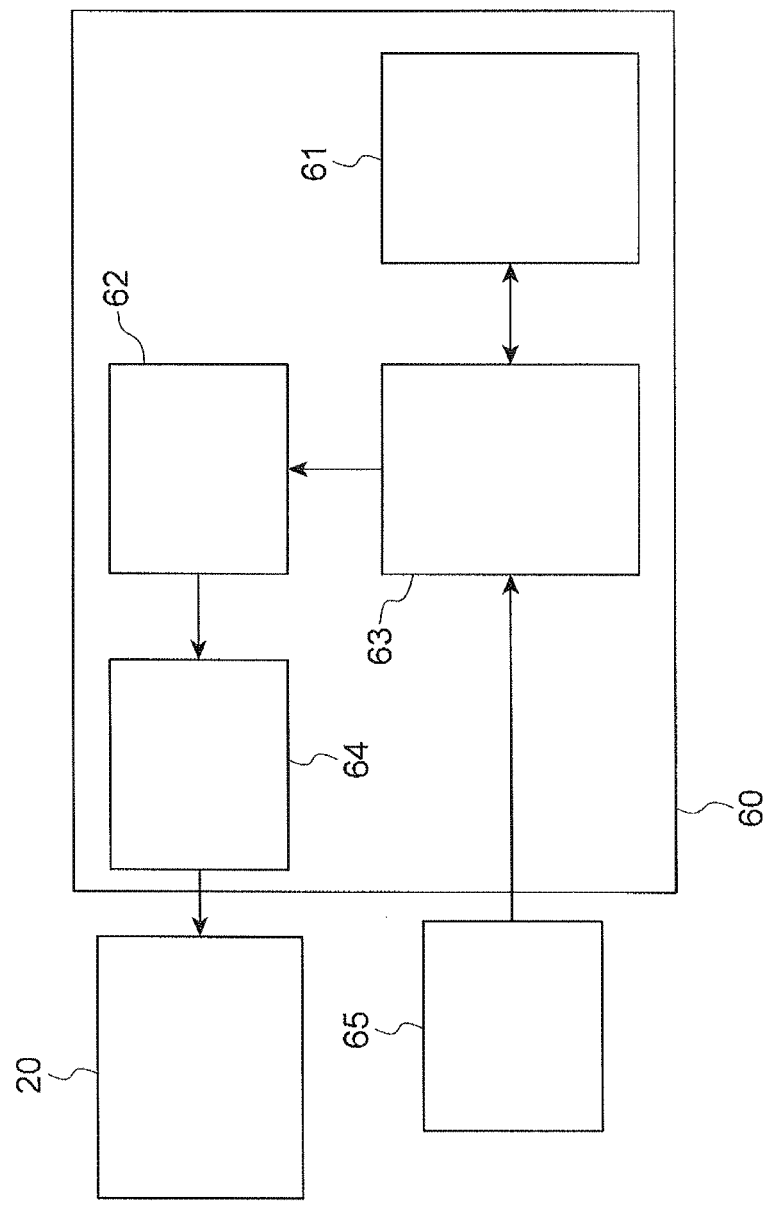
FIG. 3 is a block diagram showing an internal configuration of a control section of the first embodiment.

FIG. 3 is a block diagram showing an internal configuration of the control section 60 of the present embodiment. Here, the configuration shown in FIG. 3 is the configuration of a part that generates a control signal Sa to be provided to the spatial light modulator 20, but the configuration of a part that generates a control signal Sb to be provided to the spatial light modulator 50 is also the same as this.

As shown in FIG. 3, the control section 60 has a storage unit 61, a calculation unit 62, a selection unit 63, a drive unit 64, and an external input unit 65.

The storage unit 61 stores data regarding a kinoform that the phase modulation plane 20a of the spatial light modulator 20 is caused to display. The kinoform may be one calculated by the calculation unit 62 to be described later, or may be one input to the light modulation apparatus 1A after being previously calculated in the outside of the light modulation apparatus 1A. Further, the storage unit 61 may further store data regarding a correction pattern for correcting aberration (phase distortion) generated in at least one of the optical system, the spatial light modulator 20, and the spatial light modulator 50 provided in the light modulation apparatus 1A, and a temperature information table for associating the correction patterns and detected temperatures.

In addition, the storage unit 61 may store data regarding kinoforms or correction patterns in a compressed state. In that case, the control section 60 preferably further has a data processing unit for decompressing the data. Further, the storage unit 61 is favorably realized by a storage element (memory) having a certain amount of large volume of capacity. For example, when the kinoform is an 8-bit image with SVGA resolution (800 pixels×600 pixels), in the case where data is not compressed, a data volume per one piece of kinoform data is 480 kilobytes. Thus, the storage unit 61 is desirably realized by a storage element having a capacity capable of storing such large volumes of data.

The calculation unit 62 calculates a kinoform that the phase modulation plane 20a is caused to display such that the modulated light P2 has a predetermined intensity distribution. The calculation unit 62 adds a correction pattern for correcting phase distortion to the thus calculated kinoform, according to necessity.

The selection unit 63, when the storage unit 61 has stored a plurality of kinoforms, selects one or a plurality of kinoforms based on an instruction from the external input unit 65 such as, for example, a keyboard. The drive unit 64 generates a control signal including a kinoform provided from the calculation unit 62, and provides the control signal to the spatial light modulator 20. In addition, the storage unit 61, the calculation unit 62, the selection unit 63, and the drive unit 64 included in the control section 60 may be housed in a single housing, or may be provided separated from each other.

Figure 4:
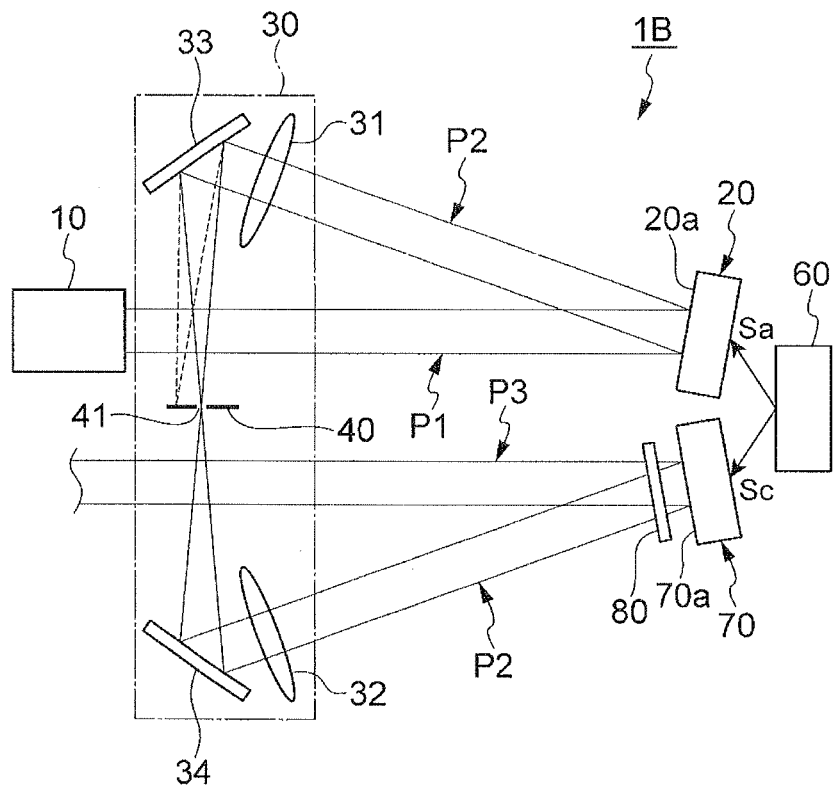
FIG. 4 includes views schematically showing the other configurations of the first embodiment.
Figure 4:
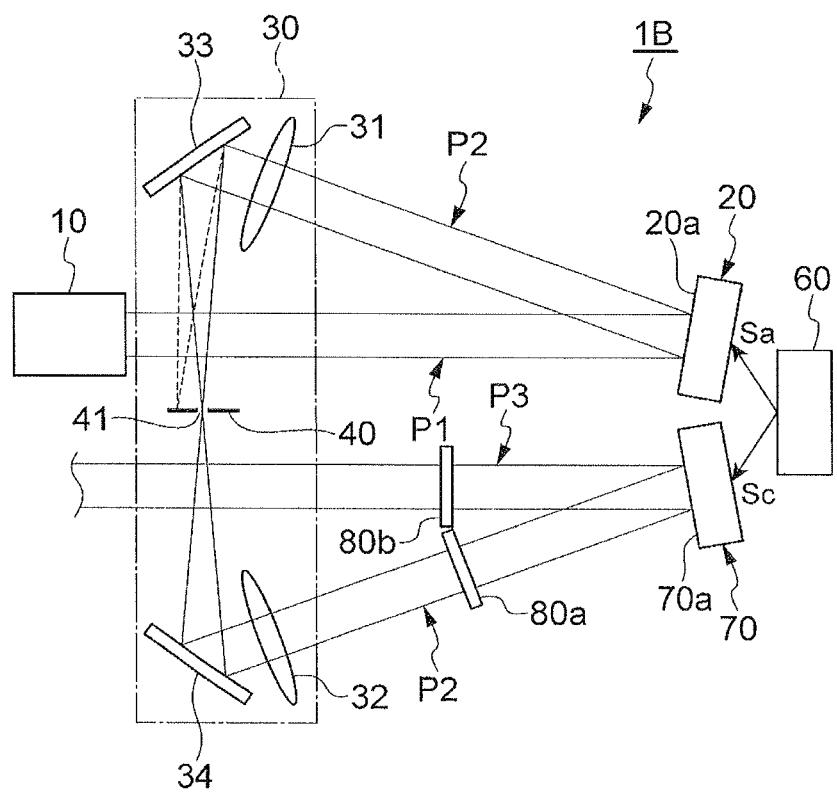

(a) in FIG. 4 is a view schematically showing a configuration of a light modulation apparatus 1B as another configuration of the present embodiment. This light modulation apparatus 1B includes a spatial light modulator 70 and a ¼ wave plate 80 in place of the spatial light modulator 50 of the light modulation apparatus 1A shown in FIG. 1.

The spatial light modulator 70 is a second spatial light modulator in the light modulation apparatus 1B, and is a phase modulation type spatial light modulator. The spatial light modulator 70 has a second phase modulation plane 70a including a plurality of regions that are arrayed one-dimensionally or two-dimensionally, and modulates the phase of modulated light P2 incident on the phase modulation plane 70a through the light passing hole 41 of the pinhole member 40 in each of the plurality of regions. On the phase modulation plane 70a, a phase distribution pattern is displayed according to a control signal Sc provided from the control section 60. Modulated light P3 subjected to phase modulation by the phase modulation plane 70a exits to the outside of the light modulation apparatus 1A with an optical axis that is along the optical axis direction of light P1.

The phase distribution pattern that is displayed on the phase modulation plane 70a includes phase values respectively for the plurality of pixels so that the modulated light P3 after exiting from the phase modulation plane 70a and passing through the ¼ wave plate 80 has a predetermined polarization state. Further, this phase distribution pattern may include a wavefront phase distortion correction pattern for correcting wavefront phase distortion generated in both or either one of the spatial light modulators 20 and 70. In an example, the phase value that is displayed in each region of the phase modulation plane 70a is a value in which a desired phase value and a wavefront phase distortion correction value are added. In addition, the wavefront phase distortion correction pattern may be a pattern for correcting phase distortion generated in the optical system as a whole or a part of the optical system.

The ¼ wave plate 80 is a phase plate in the present embodiment, and disposed on an optical path of the modulated light P2 between the pinhole member 40 and the phase modulation plane 70a and on an optical path of the modulated light P3 output from the phase modulation plane 70a. The angle and orientation of the ¼ wave plate 80 with respect to each optical axis of the modulated light P2 and the modulated light P3 are set so as to convert the polarization state of the modulated light P2 incident on the phase modulation plane 70a from linear polarization to circular polarization, and convert the polarization state of the modulated light P3 output from the phase modulation plane 70a from circular polarization to linear polarization. In addition, for performing such setting easily, the ¼ wave plate 80 is preferably mounted on a stage that is capable of rotation and movement. In addition, as shown in (b) in FIG. 4, the light modulation apparatus 1B may include a ¼ wave plate 80a serving as a first phase plate disposed on the optical path of the modulated light P2 between the pinhole member 40 and the phase modulation plane 70a, and a ¼ wave plate 80b serving as a second phase plate disposed on the optical path of the modulated light P3 output from the phase modulation plane 70a, in place of the ¼ wave plate 80. In this case, as the first phase plate on the optical path of the modulated light P2 between the pinhole member 40 and the phase modulation plane 70a, a ½ wave plate may be provided in place of the ¼ wave plate 80a. The polarization direction of the modulated light P3 can thereby be adjusted.

The light modulation apparatus 1A and the light modulation apparatus 1B of the present embodiment operate as follows. First, light P1 (preferably, light of linear polarization) emitted from the light source 10 enters the phase modulation plane 20a of the spatial light modulator 20. Then, the light P1 is modulated according to a phase pattern including a kinoform displayed on the phase modulation plane 20a, and output from the phase modulation plane 20a as modulated light P2. Because a diffraction grating pattern for intensity modulation is included in the kinoform, in the modulated light P2, diffracted light components such as of negative first-order, zeroth-order, first-order, second-order, and third-order diffraction are included. Of these, the zeroth-order light component that does not contribute to intensity modulation is blocked by the pinhole member 40, and the nth-order light component that contributes to intensity modulation passes through the pinhole member 40. There-after, the polarization state of the modulated light P2 is modulated by the polarization modulation plane 50a (refer to FIG. 1), or by the ¼ wave plate 80 or the ¼ wave plates 80a and 80b and the phase modulation plane 70a (refer to (a) in FIG. 4 or (b) in FIG. 4), and an irradiation object installed in the outside of the light modulation apparatus 1A or the light modulation apparatus 1B is irradiated with the modulated light P3 after modulation. When the light modulation apparatus 1A or 1B is, for example, a illumination system that illuminates an observation object in the case of microscopy, the observation object is irradiated with the modulated light P3. Further, when the light modulation apparatus 1A or 1B is, for example, a laser processing system that emits laser light to a processing object in the laser processing, the processing object is irradiated with the modulated light P3.

According to the light modulation apparatuses 1A and 1B of the present embodiment described above, the intensity distribution of the modulated light P3 can be controlled by the spatial light modulator 20 and the pinhole member 40, and the polarization distribution of the modulated light P3 can be controlled by the spatial light modulator 50 (or the spatial light modulator 70 and the ¼ wave plate 80 (or 80a and 80b)). Further, according to the light modulation apparatuses 1A and 1B of the present embodiment, the configuration for performing intensity modulation by the spatial light modulator 20 and the configuration for performing polarization modulation by the spatial light modulator 50 or 70 are configured together as one, which thus enables downsizing of the apparatus. In addition, usually, a phase modulation type spatial light modulator performs phase modulation of only a polarization component in one certain direction, as in the present embodiment, the spatial light modulators 50 and 70 for polarization modulation are preferably disposed at a subsequent stage of the spatial light modulator 20 for phase modulation.

Further, in the light modulation apparatuses 1A and 1B, intensity modulation, phase modulation, and polarization modulation can be performed by electrically driving the spatial light modulator 20 and the spatial light modulator 50 (or 70), which allows eliminating (or reducing) mechanical drive parts. Thus, a light modulation apparatus that is robust for environmental changes and changes in setting values, etc., can be realized.

Further, according to the light modulation apparatus 1A shown in FIG. 1, the ¼ wave plate 80 (or 80a, 80b) can be omitted, compared with the light modulation apparatus 1B shown in (a) in FIG. 4 or (b) in FIG. 4. Thus, the number of optical components can be reduced to lower manufacturing costs.

Figure 5:
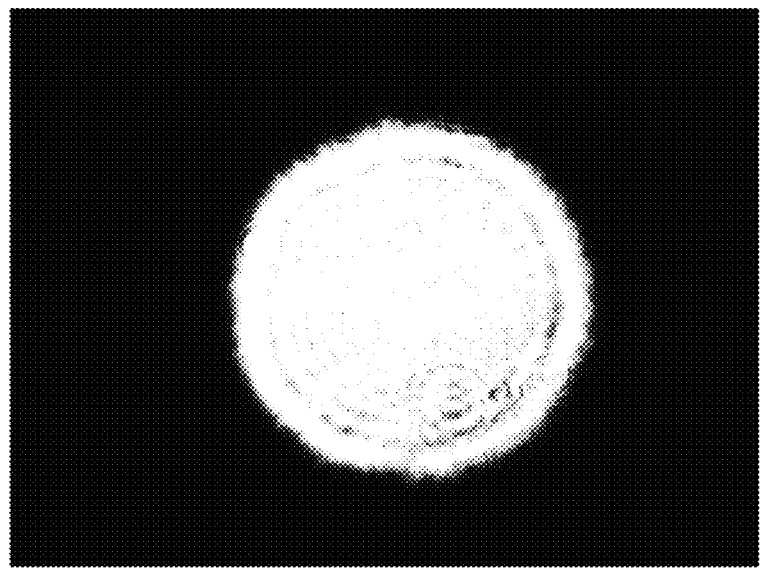
FIG. 5 includes images showing light intensity distributions within a plane perpendicular to an optical axis of modulated light.
Figure 5:
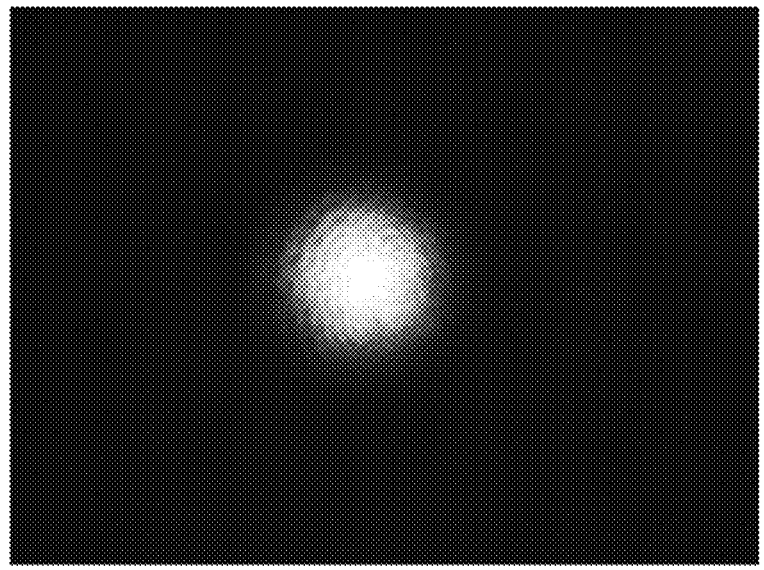

Here, (a) in FIG. 5 and (b) in FIG. 5 are images showing light intensity distributions within a plane perpendicular to the optical axis of the modulated light P3, which were obtained using a two-dimensional image sensor such as a CMOS sensor. Here, in these figures, the spatial light modulator 50 (or 70) is not driven, and only light intensity distributions generated by the spatial light modulator 20 are shown. In (a) in FIG. 5 and (b) in FIG. 5, the larger light intensity a part has, the brighter the part is displayed, and the smaller light intensity a part has, the darker the part is displayed.

(a) in FIG. 5 shows a light intensity distribution of first-order diffraction light obtained by displaying on the spatial light modulator 20 a kinoform for performing intensity modulation such that a top hat shaped intensity distribution can be obtained. Further, (b) in FIG. 5 shows a light intensity distribution of first-order diffraction light obtained by displaying on the spatial light modulator 20 a kinoform for performing intensity modulation such that a Gaussian distribution shaped intensity distribution can be obtained. As shown in these figures, by causing the spatial light modulator 20 to display an appropriate kinoform, the intensity distribution of the modulated light P3 can be easily controlled.

Figure 6:
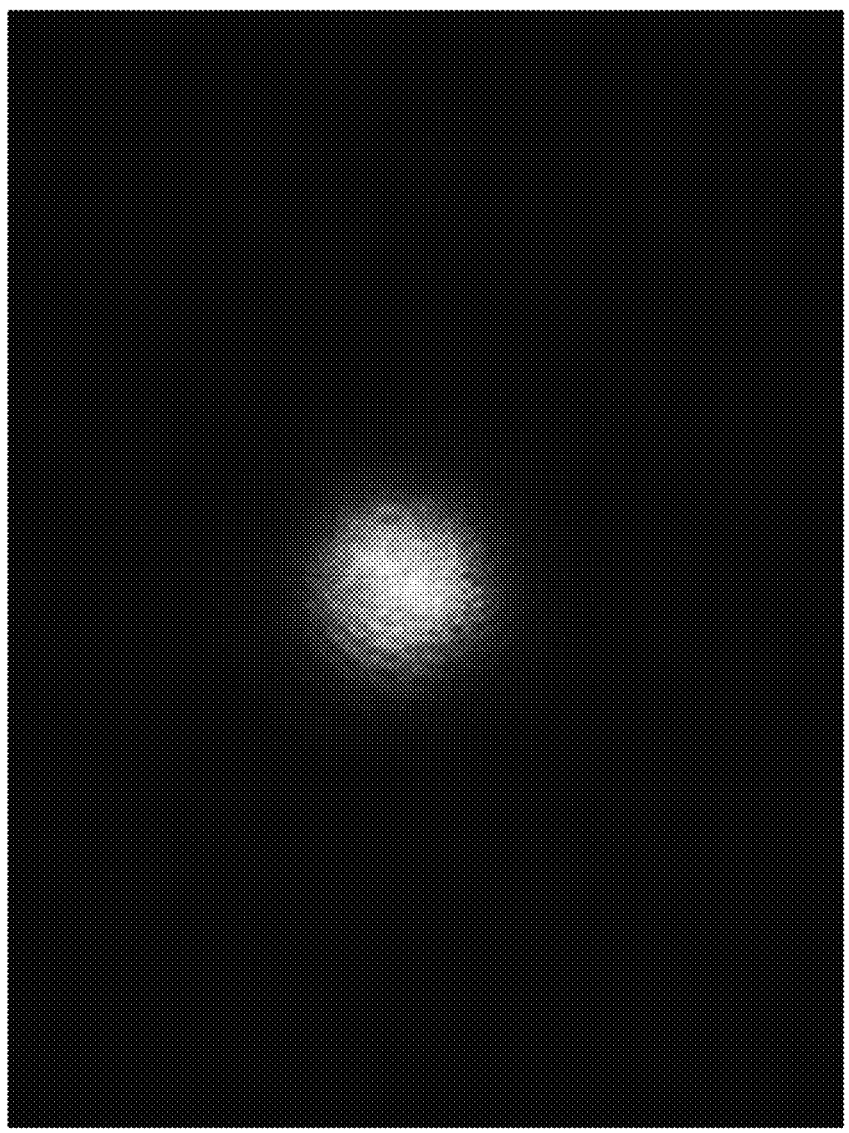
FIG. 6 is an image showing a light intensity distribution within a plane perpendicular to an optical axis of modulated light when polarization modulation is performed in a spatial light modulator.

Further, FIG. 6 is an image showing a light intensity distribution within a plane perpendicular to the optical axis of the modulated light P3 when polarization modulation is performed in the spatial light modulator 50 (or 70). That is, the image shown in FIG. 6 shows a light intensity distribution of the modulated light P3 obtained by causing the spatial light modulator 20 to display a kinoform for performing intensity modulation for obtaining a Gaussian distribution shaped intensity distribution, and further causing the spatial light modulator 50 (or 70) to display a phase pattern for performing polarization modulation for obtaining a radial polarization distribution. In addition, also in FIG. 6, the larger light intensity a part has, the brighter the part is displayed, and the smaller light intensity a part has, the darker the part is displayed. As shown in FIG. 6, the intensity distribution of the modulated light P3 obtained by a two-dimensional image sensor in this example has virtually no change with respect to (b) in FIG. 5. This is because the intensity distribution does not change even when polarization modulation is performed by the spatial light modulator 50 (or 70).

Figure 7:
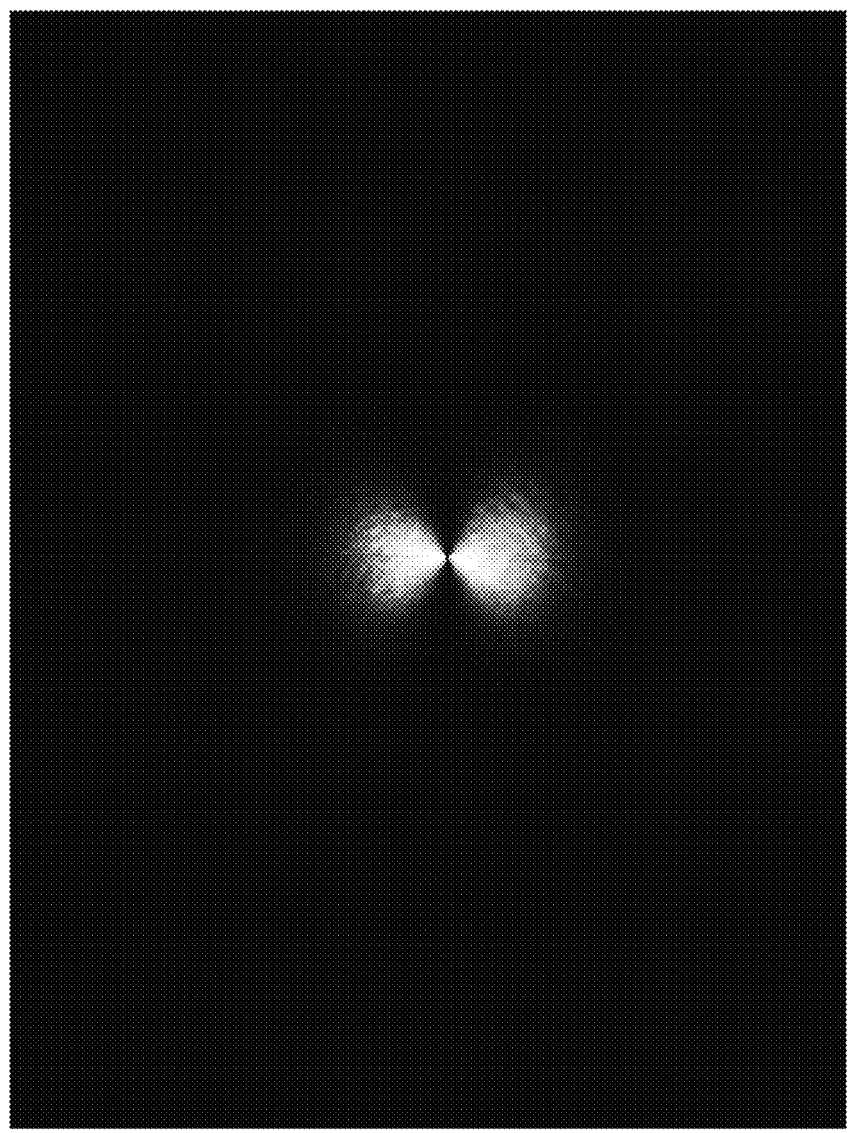
FIG. 7 is an image when a polarizer is disposed in front of a two-dimensional image sensor, and only a horizontal polarization component is detected.

In contrast thereto, an image when a polarizer was disposed in front of a two-dimensional image sensor and only a horizontal polarization component was detected is shown in FIG. 7. As shown in FIG. 7, in this image, it is dark in the up-down direction with reference to the center of the intensity distribution because virtually no horizontal polarization component exists, and it is bright in the left-right direction because a horizontal polarization component exists. Based thereon, it can be said that a radial polarization state is included in the modulated light P3.

Figure 8:
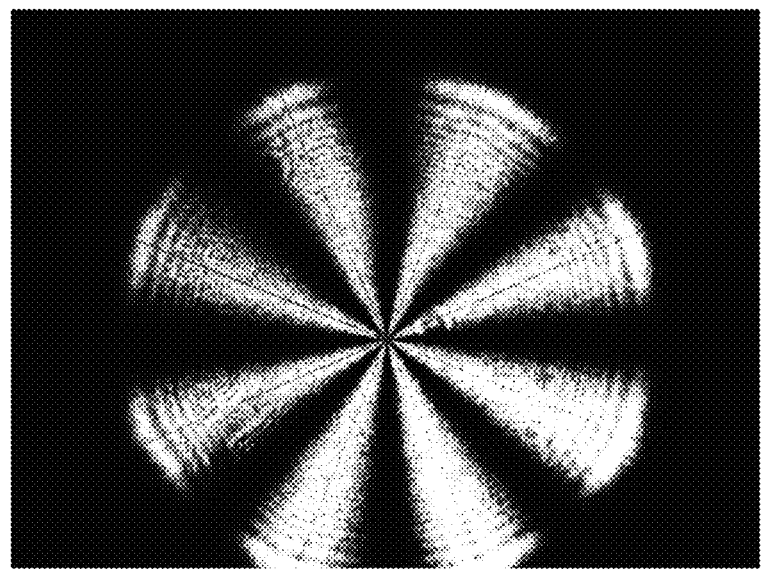
FIG. 8 includes images showing various examples of polarization modulation.
Figure 8:
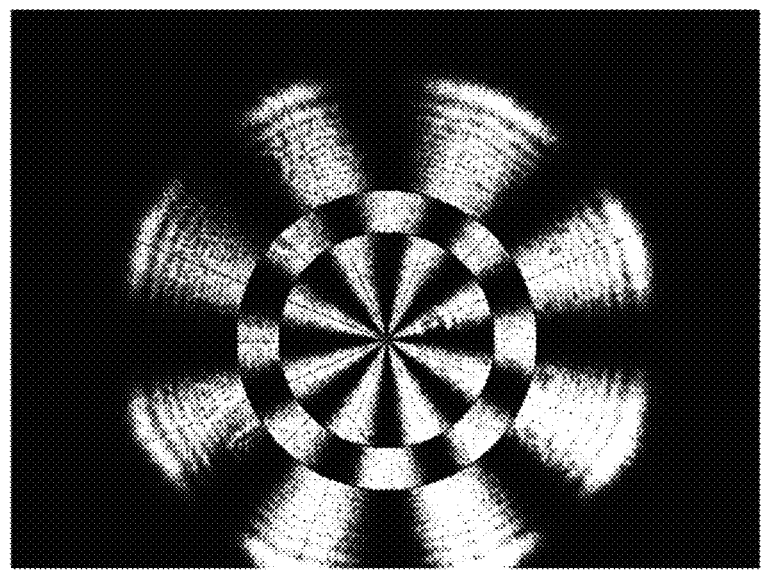

(a) in FIG. 8 and (b) in FIG. 8 are images showing various examples of polarization modulation. In addition, these images are also images obtained by disposing a polarizer in front of a two-dimensional image sensor and detecting only a horizontal polarization component. According to the light modulation apparatuses 1A and 1B of the present embodiment, generation of high-order radial polarization beams like these also becomes possible.

In addition, in the present embodiment, between the spatial light modulator 50 or the ¼ wave plate 80 or 80b and the irradiation object (or a condenser lens disposed at a previous stage of the irradiation object), optical components such as a filter, a dichroic mirror, and a magnifying and reducing optical system may be provided.

Second Embodiment

Figure 9:
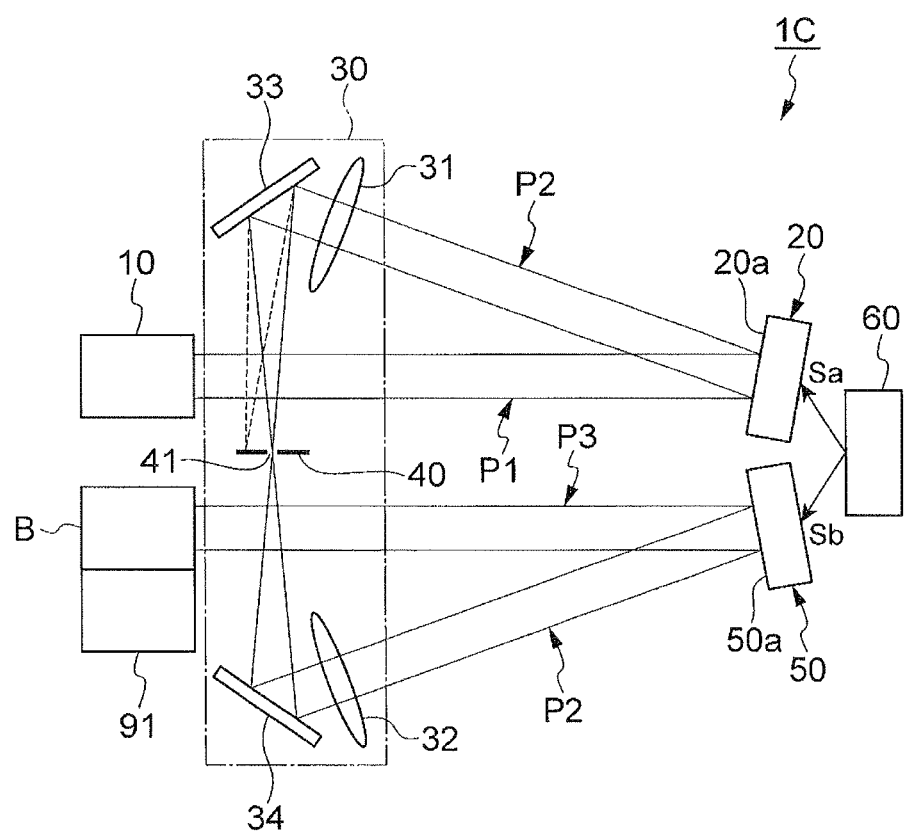
FIG. 9 is a view showing a configuration of a laser processing system as a second embodiment of the present invention.
Figure 10:
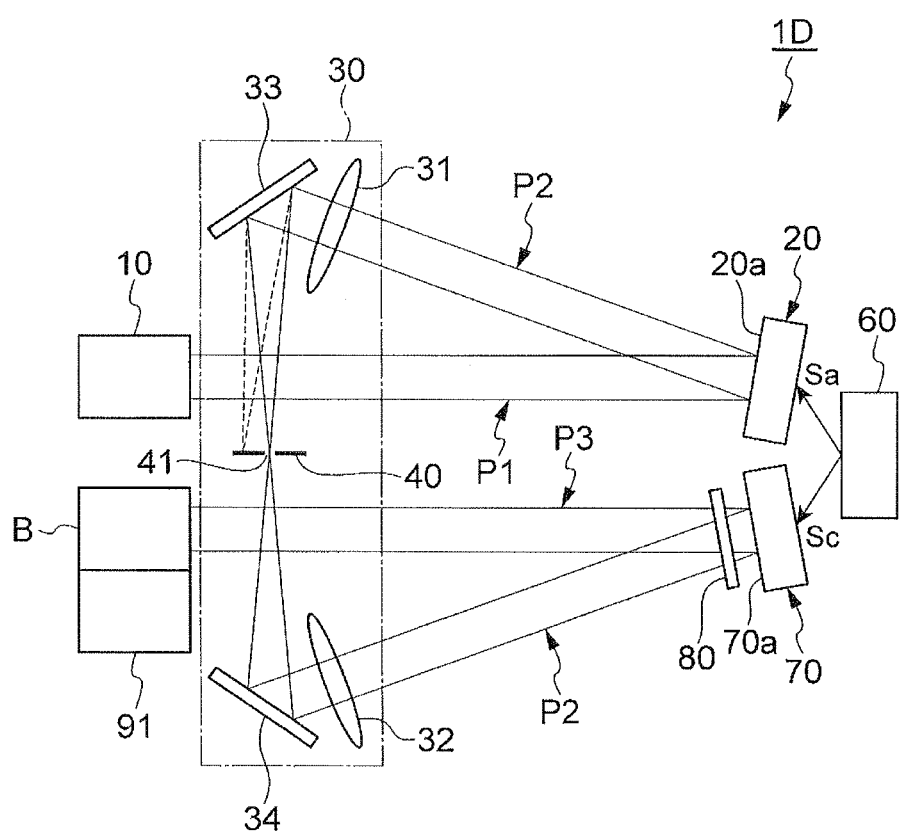
FIG. 10 is a view showing a configuration of a laser processing system as a second embodiment of the present invention.

FIG. 9 and FIG. 10 are views showing configurations of laser processing systems 1C and 1D as a second embodiment of the present invention. The laser processing system 1C shown in FIG. 9 includes the configuration of the light modulation apparatus 1A shown in FIG. 1, and the laser processing system 1D shown in FIG. 10 includes the configuration of the light modulation apparatus 1B shown in (a) in FIG. 4 or (b) in FIG. 4. In addition, FIG. 10 shows the configuration shown in (a) in FIG. 4 as the representation.

The laser processing system 1C, 1D of the present embodiment includes a stage 91 on which a processing object B being an object to be irradiated with light is placed, in addition to the configuration of the light modulation apparatus 1A, 1B of the first embodiment. The stage 91 is preferably capable of moving by at least one axis, and more preferably, is movable in any, at least one direction of an x-axis and a y-axis that intersect the optical axis of the modulated light P3 and are perpendicular to each other, a z-axis along the optical axis of the modulated light P3, around the x-axis, around the y-axis, and around the z-axis. The stage 91 may be driven either manually or electrically.

In addition, also in the present embodiment, between the spatial light modulator 50 or the ¼ wave plate 80 (or 80b) and the processing object B, optical components such as a filter, a dichroic mirror, and a magnifying and reducing optical system may be disposed.

Third Embodiment

Figure 11:
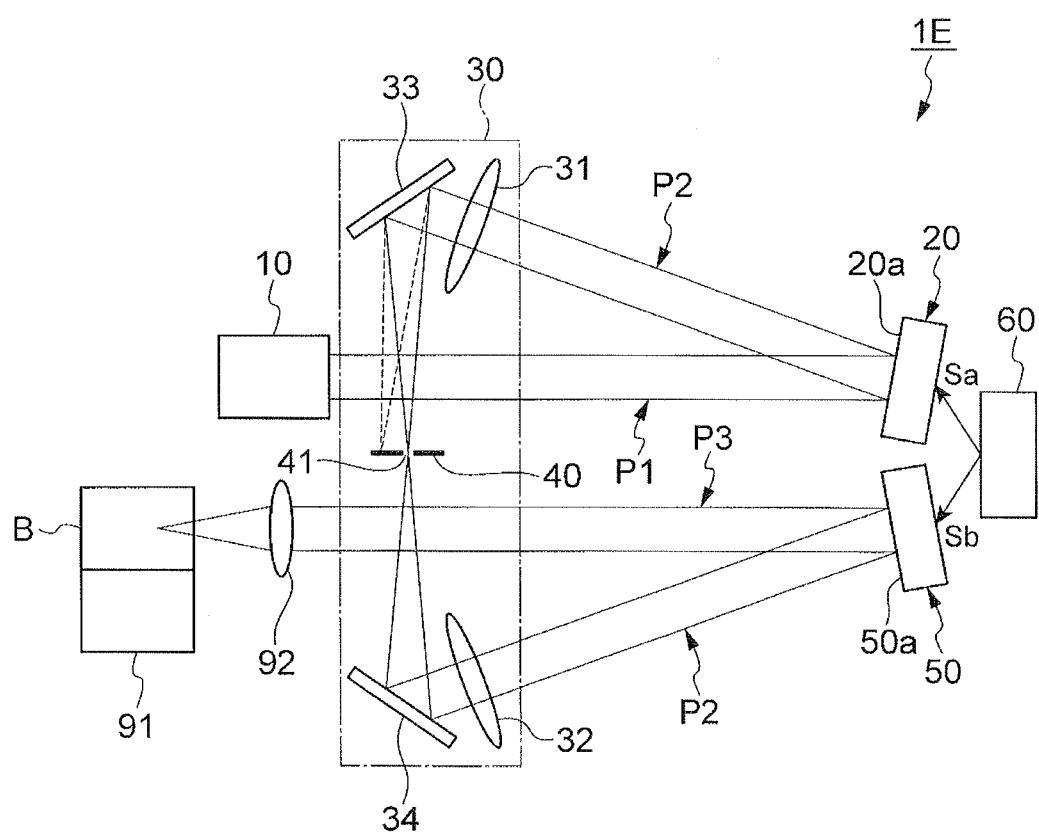
FIG. 11 is a view showing a configuration of a laser processing system as a third embodiment of the present invention.
Figure 12:
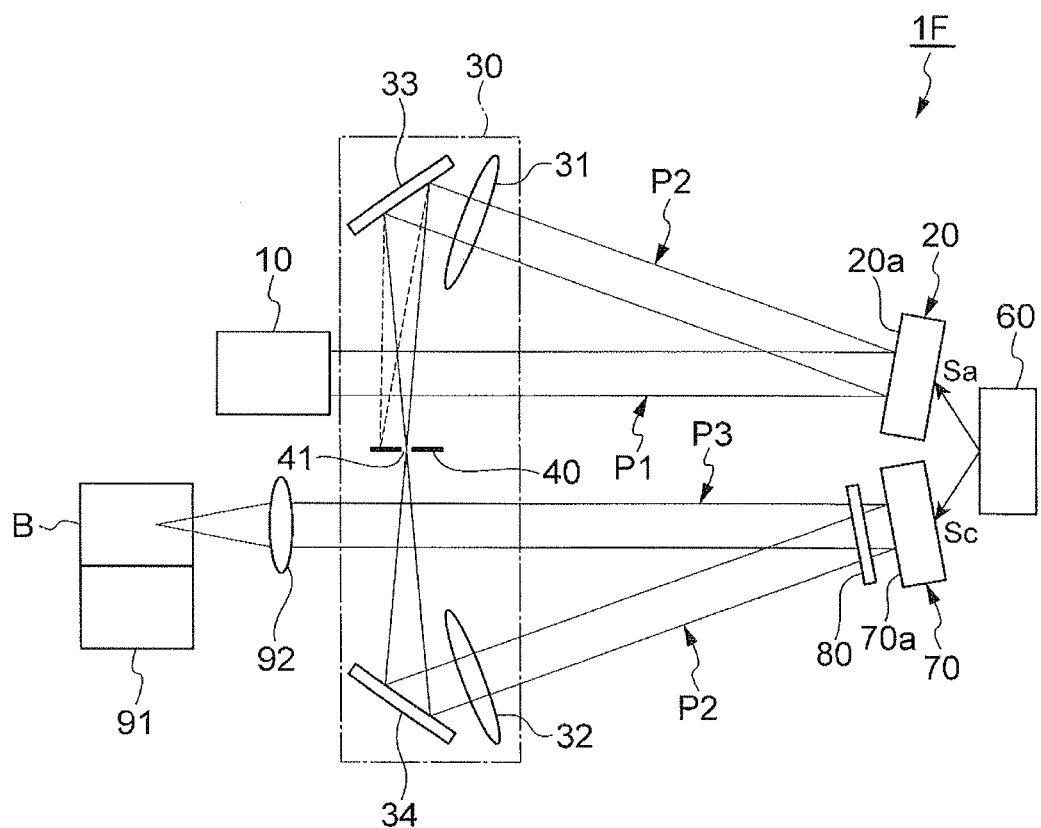
FIG. 12 is a view showing a configuration of a laser processing system as a third embodiment of the present invention.

FIG. 11 and FIG. 12 are views showing configurations of laser processing systems 1E and 1F as a third embodiment of the present invention. The laser processing system 1E shown in FIG. 11 includes the configuration of the light modulation apparatus 1A shown in FIG. 1, and the laser processing system 1F shown in FIG. 12 includes the configuration of the light modulation apparatus 1B shown in (a) in FIG. 4 or (b) in FIG. 4. In addition, FIG. 12 shows the configuration shown in (a) in FIG. 4 as the representation.

The laser processing system 1E, 1F of the present embodiment includes a stage 91 on which a processing object B is placed and a condenser lens 92 that condenses the modulated light P3 toward the processing object B, in addition to the configuration of the light modulation apparatus 1A, 1B of the first embodiment. In this configuration, a kinoform to be displayed on the phase modulation plane 20a is set such that the modulated light P3 has a desired intensity distribution in the condenser lens 92. Further, the position of the processing object B is adjusted by the stage 91 such that a processing portion is located on a focal plane of the condenser lens 92.

Fourth Embodiment

Figure 13:
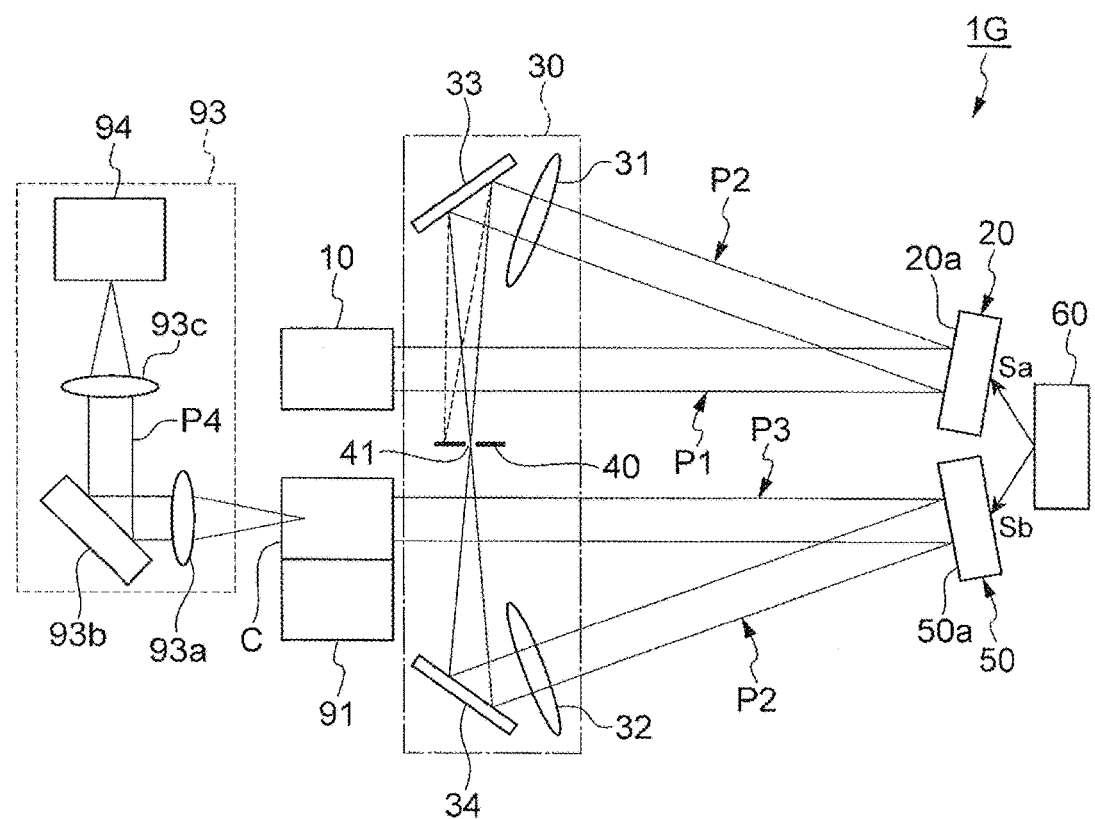
FIG. 13 is a view showing a configuration of an observation system as a fourth embodiment of the present invention.
Figure 14:
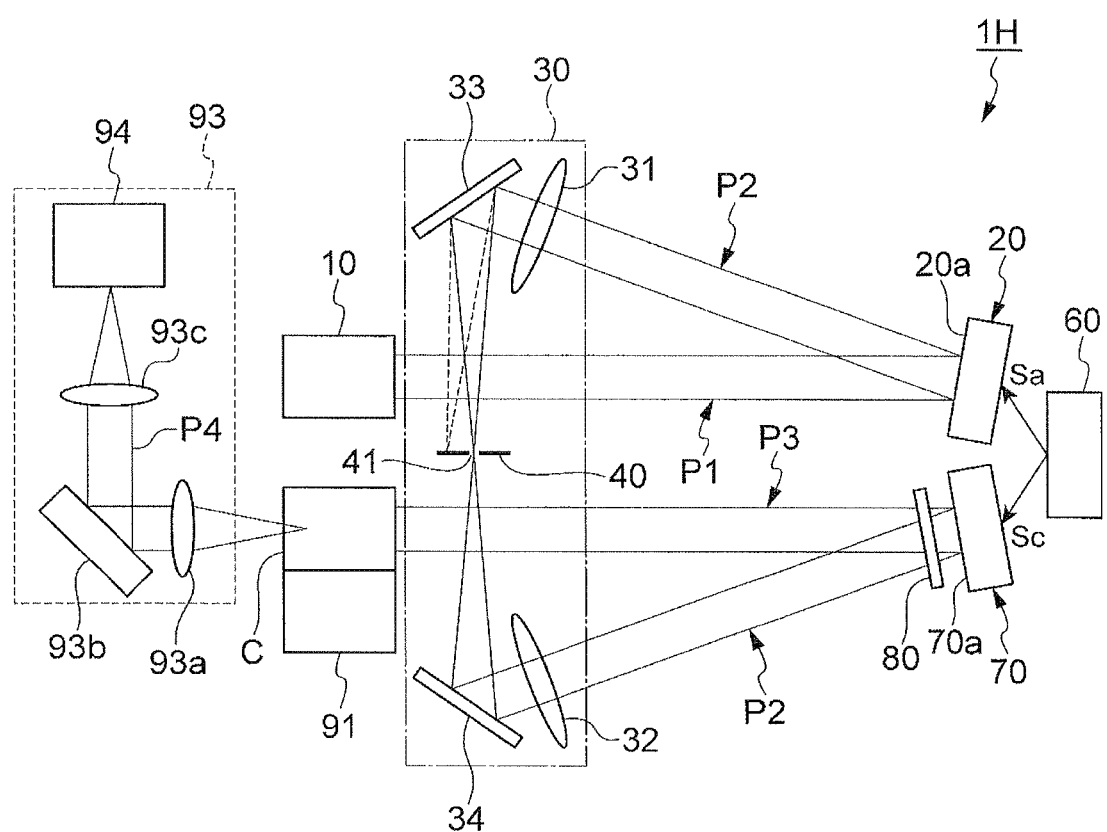
FIG. 14 is a view showing a configuration of an observation system as a fourth embodiment of the present invention.

FIG. 13 and FIG. 14 are views showing configurations of observation systems 1G and 1H as a fourth embodiment of the present invention. The observation system 1G shown in FIG. 13 includes the configuration of the light modulation apparatus 1A shown in FIG. 1, and the observation system 1H shown in FIG. 14 includes the configuration of the light modulation apparatus 1B shown in (a) in FIG. 4 or (b) in FIG. 4. In addition, FIG. 14 shows the configuration shown in (a) in FIG. 4 as the representation. These observation systems 1G and 1H are favorably used for, for example, microscopes.

The observation system 1G, 1H of the present embodiment includes a stage 91 on which an observation object C being an object to be irradiated with light is placed and a transmission type observation optical system 93, in addition to the configuration of the light modulation apparatus 1A, 1B of the first embodiment. The transmission type observation optical system 93 is disposed on an opposite side to the side on which the modulated light P3 enters with respect to the observation object C, and has a collimator lens 93a, a reflecting mirror 93b, an imaging lens 93c, and a camera 94. The camera 94 has a plurality of pixels that are arrayed one-dimensionally or two-dimensionally. Further, an observation light source that is separate from the light source 10 may be disposed halfway in the optical system of the observation system 1G, 1H.

In this embodiment, in the modulated light P3 with which the observation object C is irradiated, an optical image P4 transmitted through the observation object C enters the camera 94 through the collimator lens 93a, the reflecting mirror 93b, and the imaging lens 93c. The camera 94 images the transmitted light image P4 to generate image data.

The image data to be obtained by the transmission type observation optical system 93 of the present embodiment is various data such as, for example, a transmitted light image, a transmitted light intensity, a fluorescence image, a fluorescence intensity, a luminescence image, a luminescence intensity, a scattering image, a scattering intensity, or the like. In the transmission type observation optical system 93, the wavelength of the transmitted light image P4 is selected according to the type of the observation object C. Further, the observation system 1G, 1H may further include a mechanism for changing the relative position of the transmission type observation optical system 93 (or at least one of the components of the transmission type observation optical system 93) with respect to the observation object C. This mechanism may be controlled by a signal from the outside of the observation system 1G, 1H, a feedback signal, or the like.

Further, in the present embodiment, between the observation object C and the camera 94, optical components such as a filter, a dichroic mirror, and a magnifying and reducing optical system may be disposed.

Fifth Embodiment

Figure 15:
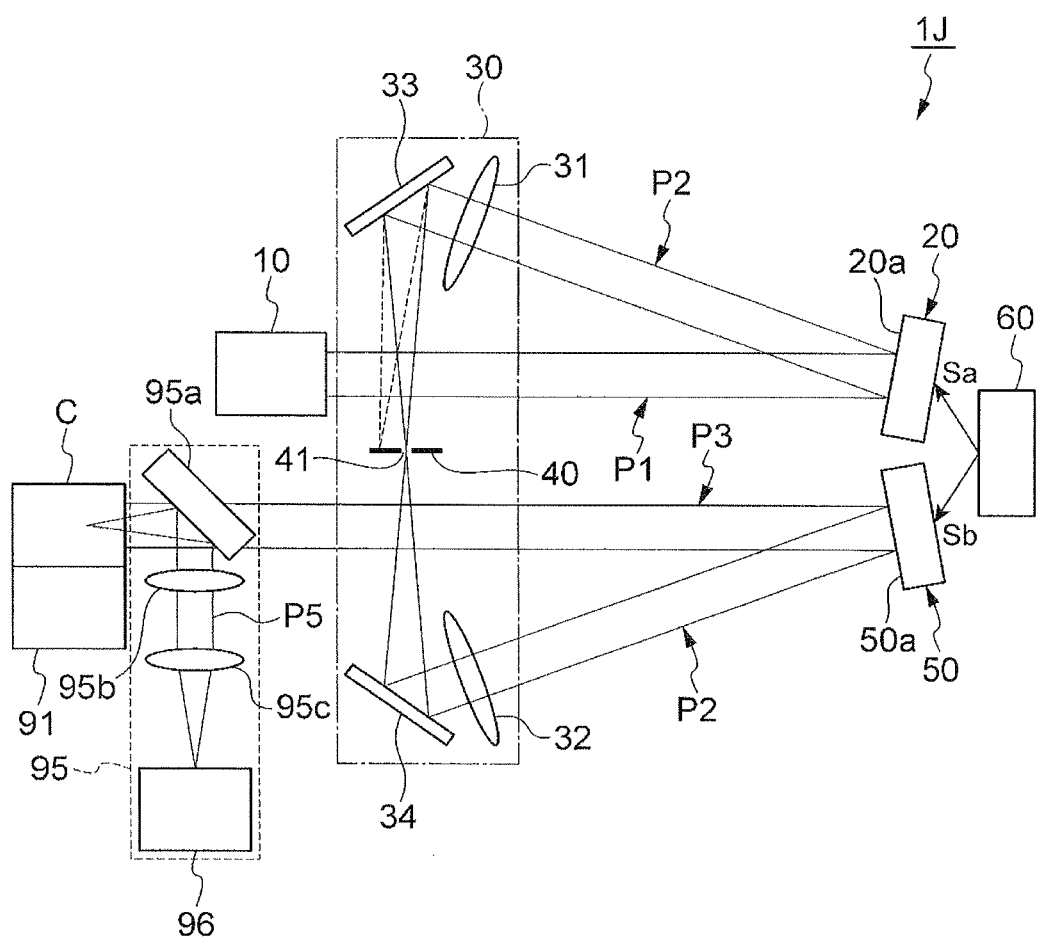
FIG. 15 is a view showing a configuration of an observation system as a fifth embodiment of the present invention.
Figure 16:
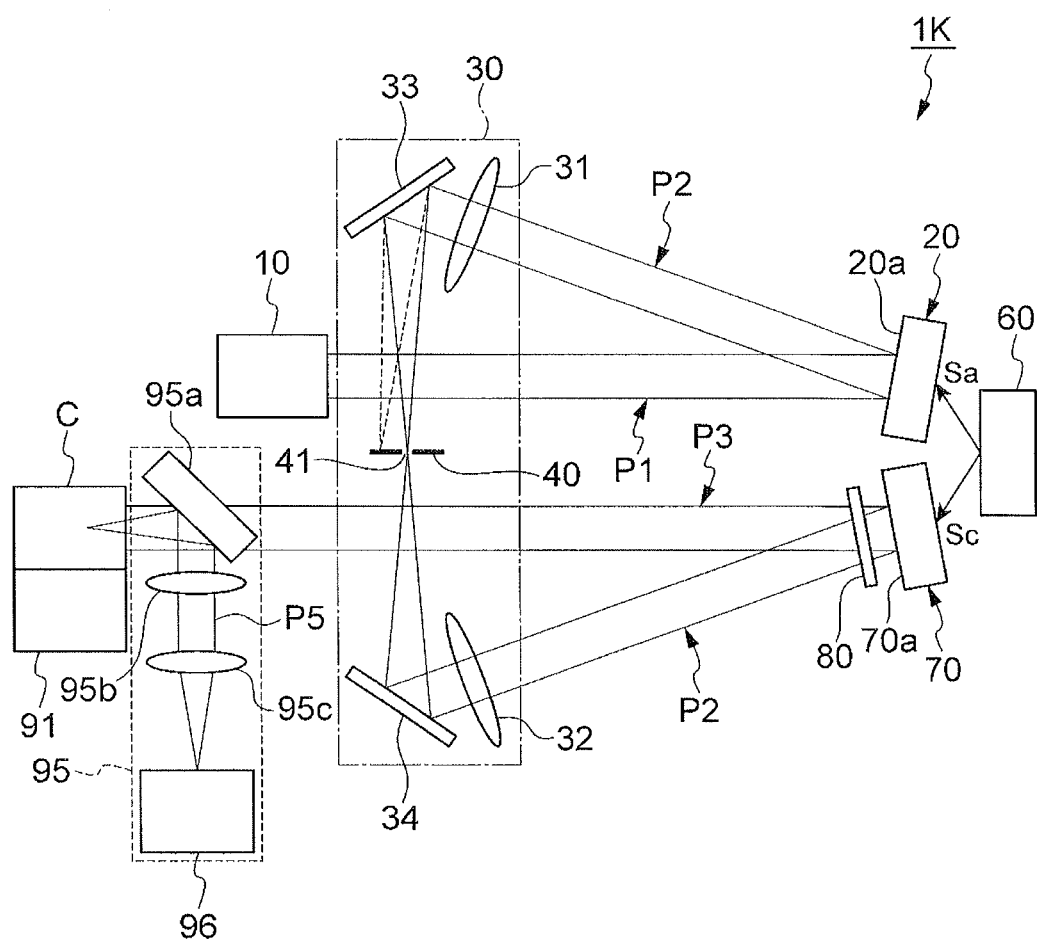
FIG. 16 is a view showing a configuration of an observation system as a fifth embodiment of the present invention.

FIG. 15 and FIG. 16 are views showing configurations of observation systems 1J and 1K as a fifth embodiment of the present invention. The observation system 1J shown in FIG. 15 includes the configuration of the light modulation apparatus 1A shown in FIG. 1, and the observation system 1K shown in FIG. 16 includes the configuration of the light modulation apparatus 1B shown in (a) in FIG. 4 or (b) in FIG. 4. In addition, FIG. 16 shows the configuration shown in (a) in FIG. 4 as the representation. These observation systems 1J and 1K are favorably used for, for example, microscopes.

The observation system 1J, 1K of the present embodiment includes a stage 91 on which an observation object C being an object to be irradiated with light is placed and a reflection type observation optical system 95, in addition to the configuration of the light modulation apparatus 1A, 1B of the first embodiment. The reflection type observation optical system 95 is disposed on the same side as the side on which the modulated light P3 enters with respect to the observation object C, and has a half mirror (or dichroic mirror) 95a, a collimator lens 95b, an imaging lens 95c, and a camera 96. The camera 96 has a plurality of pixels that are arrayed one-dimensionally or two-dimensionally. Further, an observation light source that is separate from the light source 10 may be disposed halfway in the optical system of the observation system 1J, 1K.

In this embodiment, in the modulated light P3 with which the observation object C is irradiated, an optical image P5 reflected on the observation object C enters the camera 96 through the mirror 95a, the collimator lens 95b, and the imaging lens 95c. The camera 96 images the reflected light image P5 to generate image data.

The image data to be obtained by the reflection type observation optical system 95 of the present embodiment is various data such as, for example, a transmitted light image, a transmitted light intensity, a fluorescence image, a fluorescence intensity, a luminescence image, a luminescence intensity, a scattering image, a scattering intensity, or the like. In the reflection type observation optical system 95, the wavelength of the reflected light image P5 is selected according to the type of the observation object C. Further, the observation system 1J, 1K may further include a mechanism for changing the relative position of the reflection type observation optical system 95 (or at least one of the components of the reflection type observation optical system 95) with respect to the observation object C. This mechanism may be controlled by a signal from the outside of the observation system 1J, 1K, a feedback signal, or the like. Use of the observation system 1J, 1K allows feedback control of not only the position of the observation optical system 95 but also the intensity, phase, and polarization that are controlled by the spatial light modulator by combination with a polarizer and the like.

Further, when the observation system 1J, 1K includes a condenser lens between the spatial light modulator 50 (or the ¼ wave plate 80 or 80b) and the observation object C (refer to the third embodiment), the collimator lens 95b included in the reflection type observation optical system 95 may serve also as the condenser lens. This allows reducing the number of optical components, which can contribute to lowering manufacturing costs. Further, at this time, it is preferable that the mirror 95a is disposed between the spatial light modulator 50 (or the ¼ wave plate 80 or 80b) and the condenser lens.

The light modulation apparatus according to the present invention is not limited to the embodiments described above, and various other modifications can be made. For example, the light modulation apparatuses of the above-described respective embodiments include a Kepler type both-side telecentric optical system as an optical system that optically couples the first spatial light modulator and the second spatial light modulator, but various optical systems other than this optical system can also be used as an optical system that optically couples the spatial light modulators. Further, in the above-described respective embodiments, a configuration in which the first spatial light modulator and the second spatial light modulator are separately provided has been exemplified, but the first and second spatial light modulators may be parts of a single light modulator.

INDUSTRIAL APPLICABILITY

The present invention is applicable as a light modulation apparatus that is capable of controlling the intensity distribution and polarization state and that allows downsizing.

REFERENCE SIGNS LIST 1A, 1B—light modulation apparatus, 1C, 1D, 1E, 1F—laser processing system, 1G, 1H, 1J, 1K—observation system, 10—light source, 20, 70—spatial light modulator, 20a, 70a—phase modulation plane, 30—optical system, 31—front lens, 32—rear lens, 33, 34—reflecting mirror, 40—pinhole member, 41—light passing hole, 50—spatial light modulator, 50a—polarization modulation plane, 60—control section, 61—storage unit, 62—calculation unit, 63—selection unit, 64—drive unit, 65—external input unit, 80, 80a, 80b—¼ wave plate, 91—stage, 92—condenser lens, 93—transmission type observation optical system, 94, 96—camera, 95—reflection type observation optical system, B—processing object, C—observation object, P1—light, P2—modulated light, P3—modulated light, P4—transmitted light image, P5—reflected light image, Sa, Sb, Sc—control signal.

The invention claimed is:
1. A light modulation apparatus comprising:
a first spatial light modulator comprising a first phase modulation plane including a plurality of regions arrayed one-dimensionally or two-dimensionally, and configured to display a kinoform for performing intensity modulation on the first phase modulation plane and modulate light incident on the first phase modulation plane in phase in each of the plurality of regions to generate first modulated light;
a member disposed on an optical path after the first modulated light output from the first phase modulation plane and comprising a light passing hole for letting an nth-order light component (n is an integer other than 0) of the first modulated light pass therethrough, and configured to block a zeroth-order light component of the first modulated light; and
a second spatial light modulator comprising a polarization modulation plane including a plurality of regions arrayed one-dimensionally or two-dimensionally, and configured to modulate the first modulated light incident on the polarization modulation plane through the light passing hole of the member in polarization state in each of the plurality of regions to generate second modulated light.

2. A light modulation apparatus comprising:
a first spatial light modulator comprising a first phase modulation plane including a plurality of regions arrayed one-dimensionally or two-dimensionally, and configured to display a kinoform for performing intensity modulation on the first phase modulation plane and modulate light incident on the first phase modulation plane in phase in each of the plurality of regions to generate first modulated light;
a member disposed on an optical path after the first modulated light output from the first phase modulation plane and comprising a light passing hole for letting an nth-order light component (n is an integer other than 0) of the first modulated light pass therethrough, and configured to block a zeroth-order light component of the first modulated light;
a second spatial light modulator comprising a second phase modulation plane including a plurality of regions arrayed one-dimensionally or two-dimensionally, and configured to modulate the first modulated light incident on the second phase modulation plane through the light passing hole of the member in phase in each of the plurality of regions; and
a phase plate disposed on an optical path of the first modulated light between the member and the second phase modulation plane and on an optical path of the second modulated light output from the second phase modulation plane, or a first phase plate disposed on an optical path of the first modulated light between the member and the second phase modulation plane and a second phase plate disposed on an optical path of the second modulated light output from the second phase modulation plane.

3. The light modulation apparatus according to claim 1, wherein, on the first phase modulation plane, a phase distribution for performing phase modulation of the first modulated light in each of the plurality of regions is superimposed with the kinoform and displayed.

4. The light modulation apparatus according to claim 1, further comprising a Kepler type both-sided telecentric optical system optically coupling the first spatial light modulator and the second spatial light modulator, wherein the member is disposed on an optical path of the first modulated light between a pair of lenses constituting the both-sided telecentric optical system.

5. The light modulation apparatus according to claim 1, further comprising a light source configured to output light having linear polarization toward the first phase modulation plane of the first spatial light modulator.

6. The light modulation apparatus according to claim 2, wherein, on the first phase modulation plane, a phase distribution for performing phase modulation of the first modulated light in each of the plurality of regions is superimposed with the kinoform and displayed.

7. The light modulation apparatus according to claim 2, further comprising a Kepler type both-sided telecentric optical system optically coupling the first spatial light modulator and the second spatial light modulator, wherein
the member is disposed on an optical path of the first modulated light between a pair of lenses constituting the both-sided telecentric optical system.

8. The light modulation apparatus according to claim 2, further comprising a light source configured to output light having linear polarization toward the first phase modulation plane of the first spatial light modulator.

* * * * *